Patented July 27, 1943

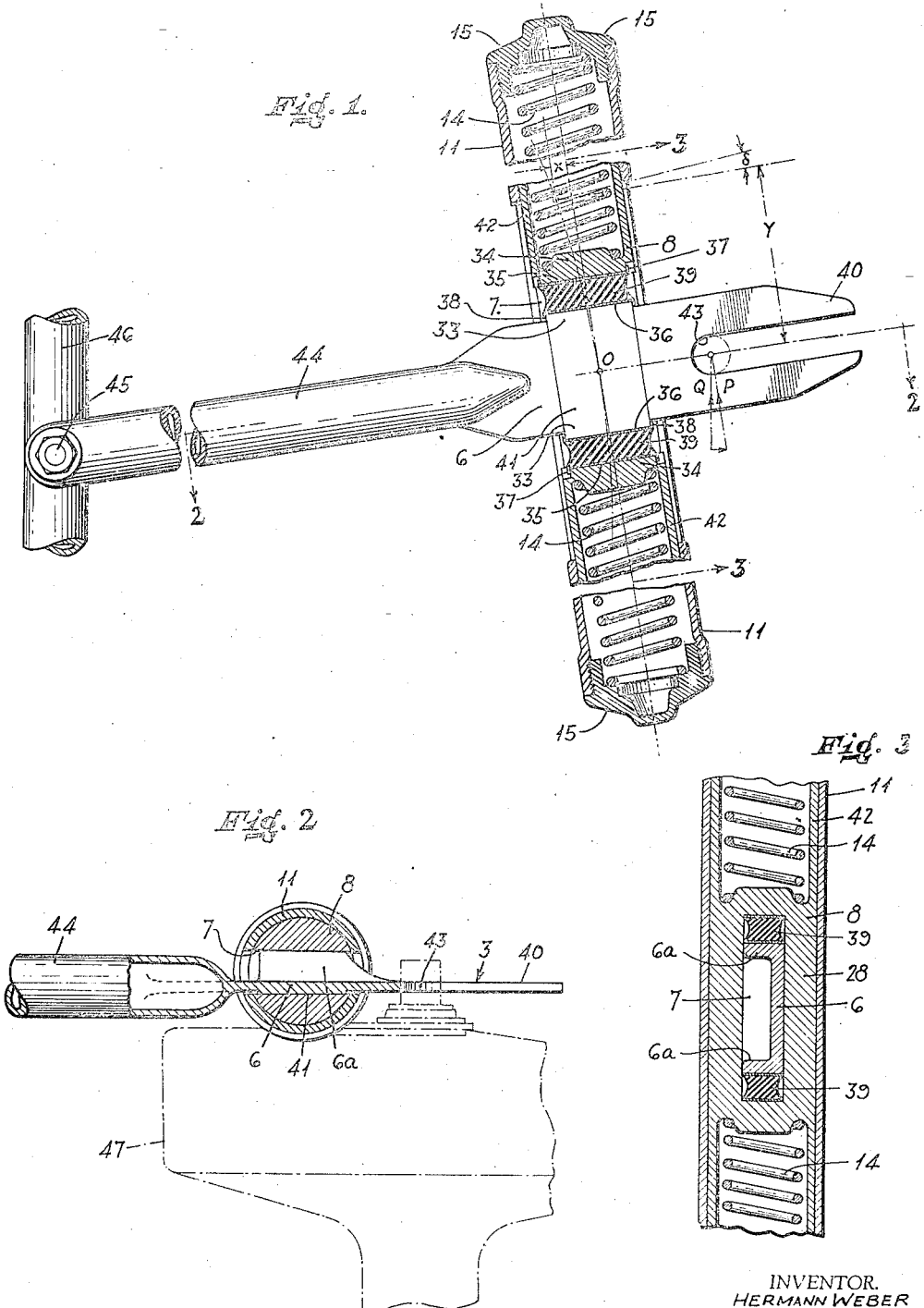

2,325,561

UNITED STATES PATENT OFFICE 2,325,561

SPRING SUSPENSION FOR VEHICLE WHEELS

Hermann Weber and Georg Petersen, Zschopau, Germany; vested in the Alien Property Custodian Continuation of application Serial No. 180,109, December 16, 1937. This application June 14, 1940, Serial No. 340,439½. In Germany December 16, 1936

2 Claims. (Cl. 280—284)

This invention relates to a spring suspension unit for the wheels of a vehicle, such as a motorcycle, automobile and the like.

The present application is a continuation of our copending patent application Serial No. 180,109 for Spring suspension for a vehicle wheel, filed December 16, 1937.

An object of the present invention is the provision of a spring suspension unit comprising a fork member carrying the wheel and centrally connected with a piston which is movable in a cylinder secured to the vehicle frame, to provide lateral bearing surfaces of large area.

Another object is the provision of a spring suspension unit the overall height of which is small as compared to prior art devices, the reduction of the height being achieved by reducing the length of the pistons of the unit without lowering the stability required of the unit.

A further object is the provision of a spring suspension unit the number of parts of which is considerably less than that of prior art units and wherein the friction of the various parts, particularly friction due to indirect causes, is comparatively small, so that the action of the springs is not hampered.

Yet another object of the present invention is the provision of a spring suspension unit for vehicle wheels which is simple and inexpensive in construction, of a light weight and of small dimension, which has a minimum number of parts and the greatest possible stability, so that the unit is particularly suitable for the rear wheels of motorcycles and for wheels of other vehicles which are not operated by a steering mechanism and which should be provided with resilient means.

Other objects of the present invention will become apparent in the course of the following specification.

The objects of the present invention may be realized through the provision of a spring suspension unit which is provided with a wheel-supporting fork member extending through the middle portion of a guiding piston and separated by elastic elements, such as rubber buffers, from this piston. The piston is provided with tubular portions which are movable within cylinders attached to the vehicle frame, coil springs being provided to facilitate the movements of the cylinders.

The invention will appear more clearly from the following detailed description when taken in connection with the accompanying drawing showing by way of example a preferred embodiment of the inventive idea.

In the drawing:

Figure 1 is a section through a device constructed in accordance with the principles of the present invention;

Figure 2 is a section along the line 2—2 of Figure 1; and

Figure 3 is a section along the line 3—3 of Figure 1.

The spring suspension unit shown in the drawing comprises a fork or link member 44 which is pivotally mounted at 45 upon a vehicle frame 46 in the usual manner. The end 6 of the fork member 44 has the form of a spade and includes a bifurcated end 40 and a middle portion 41. The axle of the wheel 47 is carried by the end portion 40.

The portion 41 of the fork member 44 extends through a slot or opening 7 provided in the central solid portion 28 of a guiding piston 8. As shown in Figure 3, the portion 41 is U-shaped in cross-section and has substantially the form of a spade, the large face of the spade closely fitting into the slot 7. The portion 41 is provided with flanges 6a which are separated by rubber buffers 39 from two opposed walls of the slot 7.

As shown in Figure 1, the member 6 is provided with stepped portions 33 at the upper and lower edges thereof. The solid central portion 28 of the piston 8 is provided with stepped portions 34 situated opposite the stepped portions 33.

In order to prevent a shifting of the rubber buffers 39 each of them is firmly connected with an upper adhesive disc 35 and a lower adhesive disc 36. The adhesive discs 35, which connect the rubber buffer 39 with the portions 34 of the piston 8 are provided with flanges 37 which are turned outwardly so that they enclose the stepped portions 34 of the piston 8. The adhesive discs 36 which are connected to the stepped portions 33 are also provided with flanges 38 which are turned outwardly to enclose these portions. Due to this arrangement, the rubber buffers 39 are securely held in place between the member 6 and the portion 28 of the piston 8.

The piston 8 is provided with two opposed tubular portions 42 which are movable in a cylinder 11 connected with the frame of the vehicle in the usual manner not shown in the drawing. The piston 8 is engaged by two coil springs 14 which are situated within the tubular portions 42 of these pistons and which engage, on the one hand, the screw caps 15 of the cylinder 11 and, on the other hand, the central portion 28 of the piston 8.

The device is operated as follows:

When the fork member 44 swings upwardly as a result of the upward movement of the vehicle wheel 47 in the course of the movement of the vehicle, the piston 8 is moved upwardly, thereby compressing the upper spring 14, while the lower spring 14 is caused to expand. At the same time, the upper rubber buffer 39 is placed under a compression load and the lower rubber buffer 39 is relieved of its load.

The inherent compression of the buffers 39 is such that parallel displacement is negligible and they allow the damping of an oscillatory movement of the fork member 44 within the slot 7. The upward component P (Figure 1) of a force Q applied to the road wheel 47 is thus transmitted to the upper coil spring 14 and thence to the frame of the vehicle with a minimum of shock between the end portion 6 of the fork member 44 and the solid central portion 28 of the piston 8.

The center O of the relative movement between the member 6 and the piston 8 moves further and further away from the longitudinal central axis 3—3 of the piston 8 as the springing action progresses; the rubber buffers 39 are then subjected to additional stresses resulting from the stroke y of the piston 8. These stresses may be separated into stresses caused by the sliding movement x and the rotary movement δ of the fork member 44 relatively to the sliding piston 8.

The rubber buffers 39 are subjected to compressing stresses in a direction parallel to the longitudinal axis of the fork member 44 under the influence of the sliding movement x, while under the influence of the rotary movement δ they are subjected on diametrically opposed sides to tensile and compression stresses, respectively, without affecting the spring suspension to any appreciable extent.

Obviously, the same results take place when the wheel moves downwardly in the course of the movement of the vehicle, thereby causing a downward movement of the fork member 44.

It is apparent that the specific illustration shown above has been given by way of illustration and not by way of limitation, and that the structures above described are subject to wide variation and modification without departing from the scope or intent of the invention, all of which variations and modifications are to be included within the scope of the present invention.

What is claimed is:

1. A spring suspension unit for a vehicle wheel, said unit comprising, in combination, a movable fork member connected with said wheel and pivoted to the frame of the vehicle, a guiding piston comprising a middle portion having an opening formed therein through which said fork member extends, and a tubular end portion; rubber buffers interposed between said movable portion and said fork member, adhesive discs connected with said rubber buffers and connecting the same to said middle portion and said fork member, a cylinder enclosing said tubular end portion and resilient means engaging said piston and situated within said cylinder.

2. A spring suspension unit for a vehicle wheel, said unit comprising, in combination, a movable fork member connected with said wheel and pivoted to the frame of the vehicle, a guiding piston comprising a middle portion having an opening formed therein through which said fork member extends, and a tubular end portion; rubber buffers interposed between said middle portion and said fork member, adhesive discs connected with said rubber buffers, and comprising flanges embracing said middle portion and said fork member; a cylinder enclosing said tubular end portion and resilient means engaging said piston and situated within said cylinder.

HERMANN WEBER.
GEORG PETERSEN.